US010056086B2

(12) United States Patent
Heitkamp et al.

(10) Patent No.: US 10,056,086 B2
(45) Date of Patent: Aug. 21, 2018

(54) SPATIAL AUDIO RESOURCE MANAGEMENT UTILIZING MINIMUM RESOURCE WORKING SETS

(71) Applicant: MICROSOFT TECHNOLOGY LICENSING, LLC, Redmond, WA (US)

(72) Inventors: Robert Norman Heitkamp, Sammamish, WA (US); Ziyad Ibrahim, Redmond, WA (US); Paul J. Radek, Bellevue, WA (US); Steven Marcel Elza Wilssens, Kenmore, WA (US); Philip Andrew Edry, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/615,173

(22) Filed: Jun. 6, 2017

(65) Prior Publication Data

US 2018/0174592 A1 Jun. 21, 2018

Related U.S. Application Data

(60) Provisional application No. 62/435,658, filed on Dec. 16, 2016.

(51) Int. Cl.
*G06F 17/00* (2006.01)
*G10L 19/008* (2013.01)
(Continued)

(52) U.S. Cl.
CPC ............ *G10L 19/008* (2013.01); *H04S 7/302* (2013.01); *H04S 7/305* (2013.01); *H04S 2400/11* (2013.01);
(Continued)

(58) Field of Classification Search
CPC ....... G10L 19/008; H04S 7/302; H04S 7/305; H04S 2400/11; H04S 2420/01; H04S 2420/11
(Continued)

(56) References Cited

U.S. PATENT DOCUMENTS

| | | | |
|---|---|---|---|
| 7,398,207 | B2 | 7/2008 | Riedl |
| 7,831,270 | B2 | 11/2010 | Kalley et al. |

(Continued)

OTHER PUBLICATIONS

Burgess, et al., "An Architecture for Spatial Audio Servers", In GVU Center Technical Reports, Mar. 1994, 6 pages.

(Continued)

*Primary Examiner* — Vivian Chin
*Assistant Examiner* — Ammar Hamid
(74) *Attorney, Agent, or Firm* — Newport IP, LLC; Scott Y. Shigeta

(57) ABSTRACT

The present disclosure enables applications of a computing system to coordinate object-based audio resources by the use of a minimum resource working set. The minimum resource working set encourages an application to be fair in its requirements since specifying a large number will most likely result in the application receiving zero resources, or losing all of its resources to another application. A working set, which can include a minimum and a maximum working set, also provides a useful metric for the spatial audio resource manager to use when balancing demand. In addition, a minimum working set provides a performance metric for resource balancing since it exposes what the minimum functional requirement is from the maxim requested resource claim.

20 Claims, 4 Drawing Sheets

(51) Int. Cl.
*H04S 7/00* (2006.01)
*H04R 5/00* (2006.01)

(52) U.S. Cl.
CPC ....... *H04S 2420/01* (2013.01); *H04S 2420/11* (2013.01)

(58) Field of Classification Search
USPC ............................................... 700/94; 381/23
See application file for complete search history.

(56) References Cited

U.S. PATENT DOCUMENTS

| | | | |
|---|---|---|---|
| 8,498,723 | B2 | 7/2013 | Sampat et al. |
| 8,713,440 | B2 | 4/2014 | Bhattacharjee et al. |
| 9,530,422 | B2 | 12/2016 | Klejsa et al. |
| 9,563,532 | B1 | 2/2017 | Hundt et al. |
| 2003/0182001 | A1 | 9/2003 | Radenkovic et al. |
| 2005/0138664 | A1 | 6/2005 | Neogi |
| 2015/0235645 | A1* | 8/2015 | Hooks .................. G10L 19/008 704/500 |
| 2016/0212559 | A1 | 7/2016 | Mateos Sole et al. |

OTHER PUBLICATIONS

Herder, Jens., "Sound Spatialization Framework: An Audio Toolkit for Virtual Environments", In Journal of the 3D-Forum Society, vol. 12, No. 3, Sep. 1998, pp. 1-6.
"Spatial Audio Work in the Multimedia Computing Group", http://web.archive.org/web/20061001094530/http:/apple2.org.za/gswv/a2zine/GS.WorldView/Resources/MISC/Hightech.Sound/Spatial.Audio.Work.html, Oct. 1, 2006, 4 pages.
Zhang, et al., "Resource Allocation for Multimedia Streaming Over the Internet", In Journal of IEEE Transactions on Multimedia, vol. 3, No. 3, Sep. 2001, pp. 339-355.

* cited by examiner

SPATIAL AUDIO RESOURCE MANAGEMENT UTILIZING MINIMUM RESOURCE WORKING SETS

CROSS REFERENCE TO RELATED CASES

This Application claims the benefit of U.S. Patent Application No. 62/435,658 filed on Dec. 16, 2016, entitled Spatial Audio Resource Management Utilizing Minimum Resource Working Sets, the subject matter of which is hereby incorporated by reference in its entirety.

BACKGROUND

Some software applications can process object-based audio to utilize one or more spatialization technologies. For instance, a video game can utilize a spatialization technology, such as Dolby Atmos, to generate a rich sound that enhances a user's experience. Although some applications can utilize one or more spatialization technologies, existing systems have a number of drawbacks. For instance, some systems cannot coordinate the use of spatialization technologies when multiple applications are simultaneously processing channel-based audio and object-based audio.

In one example scenario, if user is running a media player that is utilizing a first spatialization technology and running a video game utilizing another spatialization technology, both applications can take completely different paths on how they render their respective spatially encoded streams. To further this example, if the media player renders audio using HRTF-A and the video game renders audio using HRTF-B, and both output streams are directed to a headset, the user experience may be less than desirable since the applications cannot coordinate the processing of the signal to the headset.

Since some applications do not coordinate with one another when processing spatialized audio, some existing systems may not efficiently utilize computing resources. In addition, when multiple applications are running, one application utilizing a particular output device, such as a Dolby Atmos speaker system, can abridge another application's ability to fully utilize the same spatialization technology. Thus, a user may not be able to fully experience all sounds from each application.

It is with respect to these and other considerations that the disclosure made herein is presented.

SUMMARY

Devices for rendering spatial audio objects are a limited resource. In some systems, applications may ask for a specific number of spatial resources of a system in order to enable a specific experience, but if the rendering device cannot process all of the requested objects generated by the application, a subset of the number spatial resources may be granted instead. This can lead to spatial resources being granted to an application that elects not to use them, with the side effect of preventing other applications from access to the unused spatial objects.

If an application receives fewer resources than it required, one solution would be for the application to close the stream and revert to some other technology. The downside of this is it is no longer in the resource request loop. The application would have to periodically attempt to open a stream with the number of required resources until success.

Another resource solution would be to provide a method for the application to use to release unused resources back to the resource manager, when insufficient count has been received. This keeps the stream open, but still puts the burden on the application to monitor the resource manager for the minimum count available periodically and attempt to request the resources again.

The present disclosure addresses the above-described issue, and other resource issues, by the use of a minimum resource working set. More specifically, the minimum working set solves the issues stated above by only granting resources when the minimum number of objects is available, without requiring the application to monitor the resource pool. As will be described in more detail below, the minimum resource working set encourages an application to be fair in its requirements since specifying a large number will most likely result in the application receiving zero resources, or losing all of its resources to another application. A working set, which can include a minimum and a maximum working set, also provides a useful metric for the spatial audio resource manager to use when balancing demand. In addition, a minimum working set provides a performance metric for resource balancing since it exposes what the minimum functional requirement is from the maxim requested resource claim.

In some embodiments, when applications create a spatial audio stream, the application specifies the minimum working set of spatial rendering objects, and optionally, a maximum working set of spatial rendering objects. Upon receiving the request, a resource, such as a spatial audio resource manager (SARM), can grant the resource request with free resources.

If not enough free resources are available, the SARM will examine the list of open streams and deduce the number of resources that can be revoked from each without exceeding each minimum working set. By revoking resources below the working set threshold, it forces a fairness policy amongst competing applications, and reclaims resources the application has no intention of using.

If the free number of resources plus the number of possible revoked object does not satisfy the minimum working set for the new request, the stream is issued zero resources and is placed on a waiting list; otherwise the number of resources to be revoked is done in based upon a predetermined policy for each qualifying stream. Once the resources have successfully been revoked and added to the free pool, the resources will be granted to the new stream and the stream.

In some embodiments, aspects of the present disclosure can depend on a policy. For example, a policy can associate priorities with individual applications and determinations can be based on those priorities. In one illustrative example, a policy can indicate that chat programs have a higher priority than other applications such as games. Thus, even though a game may have a total number of audio objects allocated to it, preventing a chat program from obtaining a minimum number of objects, a system may still revoke all of the game objects based on the priority of one or more applications. Systems can therefore be more dynamic instead of allocating objects on a first come, first serve basis.

In some embodiments, applications and/or users can dynamically issue new min and max values during use. In such embodiments, a system can adjust the allocations to applications based on the updated min or max values.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
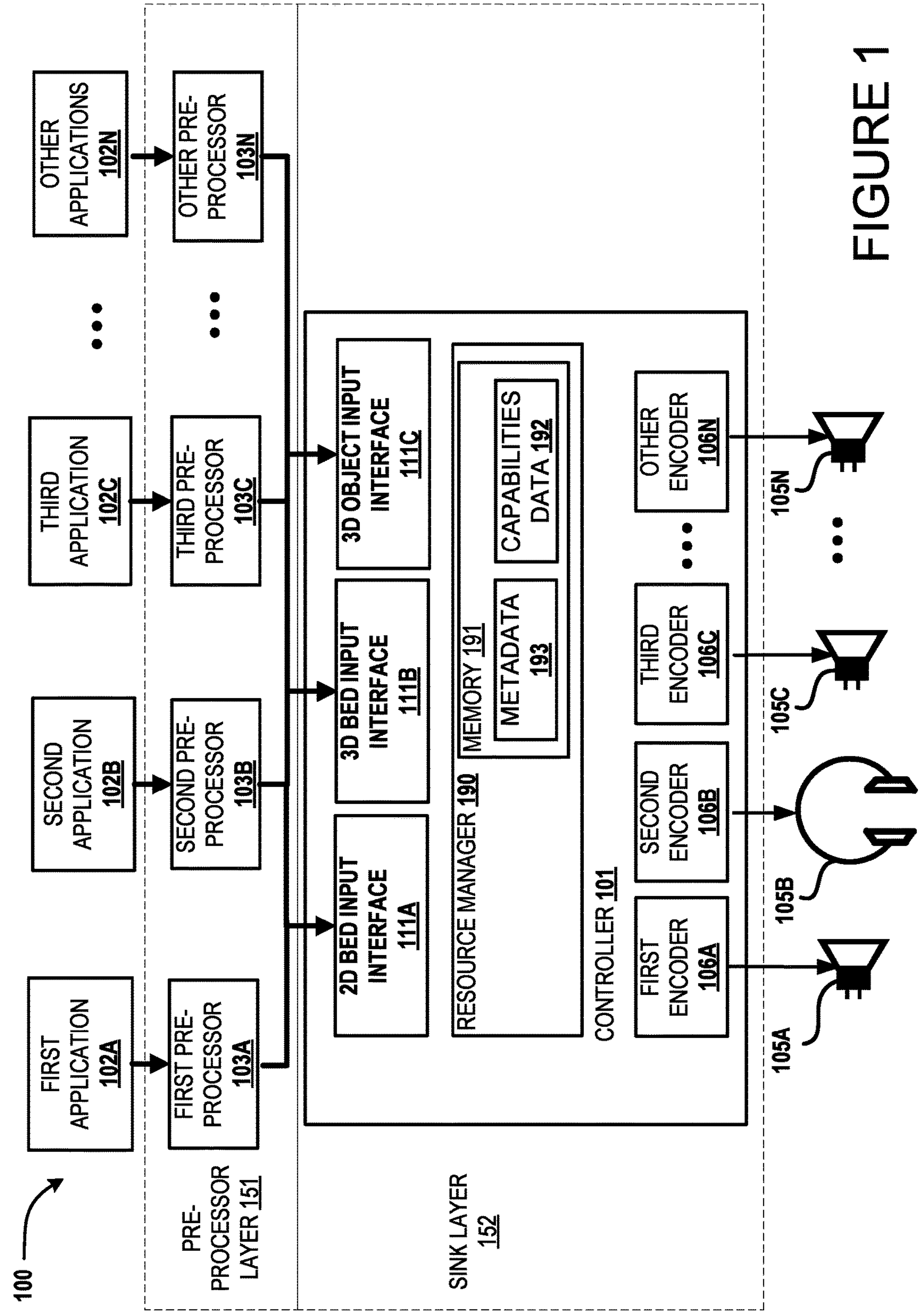
FIG. 1 is an illustrative example of a system configured to utilize minimum resource working sets.

Devices for rendering spatial audio objects are a limited resource. In some systems, applications may ask for a specific number of spatial resources of a system in order to enable a specific experience, but if the rendering device cannot process all of the requested objects generated by the application, a subset of the number spatial resources may be granted instead. This can lead to spatial resources being granted to an application that elects not to use them, with the side effect of preventing other applications from access to the unused spatial objects.

If an application receives fewer resources than it required, one solution would be for the application to close the stream and revert to some other technology. The downside of this is it is no longer in the resource request loop. The application would have to periodically attempt to open a stream with the number of required resources until success.

Another resource solution would be to provide a method for the application to use to release unused resources back to the resource manager, when insufficient count has been received. This keeps the stream open, but still puts the burden on the application to monitor the resource manager for the minimum count available periodically and attempt to request the resources again.

The present disclosure addresses the above-described issue, and other resource issues, by the use of a minimum resource working set. More specifically, the minimum working set solves the issues stated above by only granting resources when the minimum number of objects is available, without requiring the application to monitor the resource pool. As will be described in more detail below, the minimum resource working set encourages an application to be fair in its requirements since specifying a large number will most likely result in the application receiving zero resources, or losing all of its resources to another application. A working set, which can include a minimum and a maximum working set, also provides a useful metric for the spatial audio resource manager to use when balancing demand. In addition, a minimum working set provides a performance metric for resource balancing since it exposes what the minimum functional requirement is from the maxim requested resource claim.

In some embodiments, when applications create a spatial audio stream, the application specifies the minimum working set of spatial rendering objects, and optionally, a maximum working set of spatial rendering objects. Upon receiving the request, a resource, such as a spatial audio resource manager (SARM), can grant the resource request with free resources.

If not enough free resources are available, the SARM will examine the list of open streams and deduce the number of resources that can be revoked from each without exceeding each minimum working set. By revoking resources below the working set threshold, it forces a fairness policy amongst competing applications, and reclaims resources the application has no intention of using.

If the free number of resources plus the number of possible revoked object does not satisfy the minimum working set for the new request, the stream is issued zero resources and is placed on a waiting list; otherwise the number of resources to be revoked is done in based upon a predetermined policy for each qualifying stream. Once the resources have successfully been revoked and added to the free pool, the resources will be granted to the new stream and the stream.

In some embodiments, aspects of the present disclosure can depend on a policy. For example, a policy can associate priorities with individual applications and determinations can be based on those priorities. In one illustrative example, a policy can indicate that chat programs have a higher priority than other applications such as games. Thus, even though a game may have a total number of audio objects allocated to it, preventing a chat program from obtaining a minimum number of objects, a system may still revoke all of the game objects based on the priority of one or more applications. Systems can therefore be more dynamic instead of allocating objects on a first come, first serve basis.

In some embodiments, applications and/or users can dynamically issue new min and max values during use. In such embodiments, a system can adjust the allocations to applications based on the updated min or max values.

It should be appreciated that the above-described subject matter may be implemented as a computer-controlled apparatus, a computer process, a computing system, or as an article of manufacture such as a computer-readable storage medium. Among many other benefits, the techniques herein improve efficiencies with respect to a wide range of computing resources. For instance, human interaction with a device may be improved as the use of the techniques disclosed herein enable a user to hear audio generated audio signals as they are intended. In addition, improved human interaction improves other computing resources such as processor and network resources. Other technical effects other than those mentioned herein can also be realized from implementations of the technologies disclosed herein.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific configurations or examples. Referring now to the drawings, in which like numerals represent like elements throughout the several figures, aspects of a computing system, computer-readable storage medium, and computer-implemented methodologies for enabling spatial audio resource management utilizing minimum resource working sets.

FIG. 1 is an illustrative example of a system 100 configured to utilize minimum resource working sets. The system 100 comprises a controller 101 for storing, communicating, and processing capabilities data 192 and metadata 193 stored in memory 191. The controller 101 also comprises a resource manager 190 (also referred to herein as a SARM), a 2D bed input interface 111A, a 3D bed input interface 111B, and a 3D object input interface 111C respectively configured to receive input signals, e.g., 2D bed audio, 3D bed audio, and 3D object audio, from one or more applications 102. The controller 101 also comprises a suitable number (N) of encoders 106. For illustrative purposes, some example encoders 106 are individually referred to herein as a first encoder 106A, a second encoder 106B, and a third encoder 106C. The encoders 106 can be associated with a suitable number (N) of output devices 105. For illustrative purposes, some example output devices 105 are individually referred to herein as a first output device 105A, a second output device 105B, a third output device 105C.

The system 100 can also include a suitable number (N) of preprocessors 103. For illustrative purposes, some example preprocessors 103 are individually referred to herein as a first preprocessor 103A, a second preprocessor 103B, and a third preprocessor 103C. The system 100 can also include any suitable number (N) of applications 102. For illustrative purposes, some example applications 102 are individually referred to herein as a first application 102A, a second application 102B, and a third application 102C. The system 100 can also include a preprocessor layer 151 and a sink layer 152. The example system 100 is provided for illustrative purposes and is not to be construed as limiting. It can be appreciated that the system 100 can include fewer or more components than those shown in FIG. 1.

For illustrative purposes, 2D bed audio includes channel-based audio, e.g., stereo, Dolby 5.1, etc. 2D bed audio can be generated by software applications and other resources. 3D bed audio includes channel-based audio, where individual channels are associated with objects. For instance, an input signal can include multiple channels of audio and each channel can be associated with one or more positions, such as a center, front-left, front-right and other positions, each of which may also have a height parameter. Data associated with the 3D bed audio signals can define one or more positions associated with individual channels of a channel-based audio signal. 3D bed audio can be generated by software applications and other resources.

3D object audio can include any form of object-based audio. In general, object-based audio defines objects that are associated with an audio track. For instance, in a movie, a gunshot can be one object and a person's scream can be another object. Each object can also have an associated position. Metadata of the object-based audio enables applications to specify where each sound object originates and how they should move. 3D object audio can be generated by software applications and other resources.

The resource manager 190 can be configured analyze, process, and communicate the metadata, capabilities data and other data. As will be described in more detail below, the capabilities data 192 (also referred to herein as "contextual data 192") can define the capabilities of one or more components, including but not limited to an encoder 106, an output device 105, an application 102 and/or other computing resources. The contextual data 192 can also define one or more preferences, which may include user preferences, computer-generated preferences, etc. Based on the contextual data 192, the resource manager 190 can determine a threshold number of audio objects that can be processed by an encoder and an endpoint device. For example, if one encoder 106 is based on the Dolby Atmos technology, the threshold number of audio objects may be 32 objects. Such a number can also be based on the capabilities of the computing resources, such as computing power, memory, etc. A device can adjust the threshold number of audio objects. For instance, when a computing device is running a number of other processes and computing resources are limited, or when a computing device has room for more processes, the threshold number of audio objects can be lowered or raised from a predetermined number, e.g., 32 objects. In addition, the resource manager 190 can also select a spatialization technology and a corresponding encoder 106 based on the contextual data 192. The encoders 106 can utilize the selected spatialization technology to generate a spatially encoded stream that appropriately renders to an available output device. For illustrative purposes, a spatialization technology can involve a method in which object-based audio is rendered to an output audio signal. Some individual spatialization technologies, such as Dolby Atmos, can include the use of parameters, such as limits on the number of objects that can be processed, and other like parameters.

The applications 102 can include any executable code configured to process object-based audio (also referred to herein as "3D bed audio" and "3D object audio") and/or channel-based audio (also referred to herein as "2D bed audio"). Examples of the applications 102 can include but, are not limited to, a media player, a web browser, a video game, a virtual reality application, and a communications application. The applications 102 can also include components of an operating system that generate system sounds.

In some configurations, the applications 102 can apply one or more operations to object-based audio, including, but not limited to, the application of one or more folding operations. In some configurations, an application 102 can receive contextual data from the controller 101 to control the number of objects of an object-based audio signal that is generated by the application 102. An application 102 can communicate an audio signal to one more preprocessors 104. An application can also communicate an audio signal directly to an input interface 103 of the controller 101.

The preprocessors 103 can be configured to receive an audio signal of one or more applications. The preprocessors 103 can be configured to perform a number of operations to a received audio signal and direct a processed audio signal to an input interface 103 of the controller 101. The operations of a preprocessor 103 can include folding operations that can be applied to object-based audio signals. The preprocessor 103 can also be configured to process other operations, such as distance based attenuation and shape based attenuation. In configurations involving one or more folding operations, a preprocessor 103 can receive contextual data from the controller 101 to control the number of objects of an object-based audio signal that is generated by the preprocessor 103.

The encoders 106 are configured to process channel-based audio and object-based audio according to one or more selected spatialization technologies. A rendered stream generated by an encoder 106 can be communicated to one or more output devices 105. Examples of an output device 105, also referred to herein as an "endpoint device," include, but are not limited to, speaker systems and headphones. An encoder 106 and/or an output device 105 can be configured to utilize one or more spatialization technologies such as Dolby Atmos, HRTF, etc.

The encoders 106 can also implement other functionality, such as one or more echo cancellation technologies. Such technologies are beneficial to select and utilize outside of the application environment, as individual applications do not have any context of other applications, thus can't determine when echo cancelation and other like technologies should be utilized.

Figure 2:
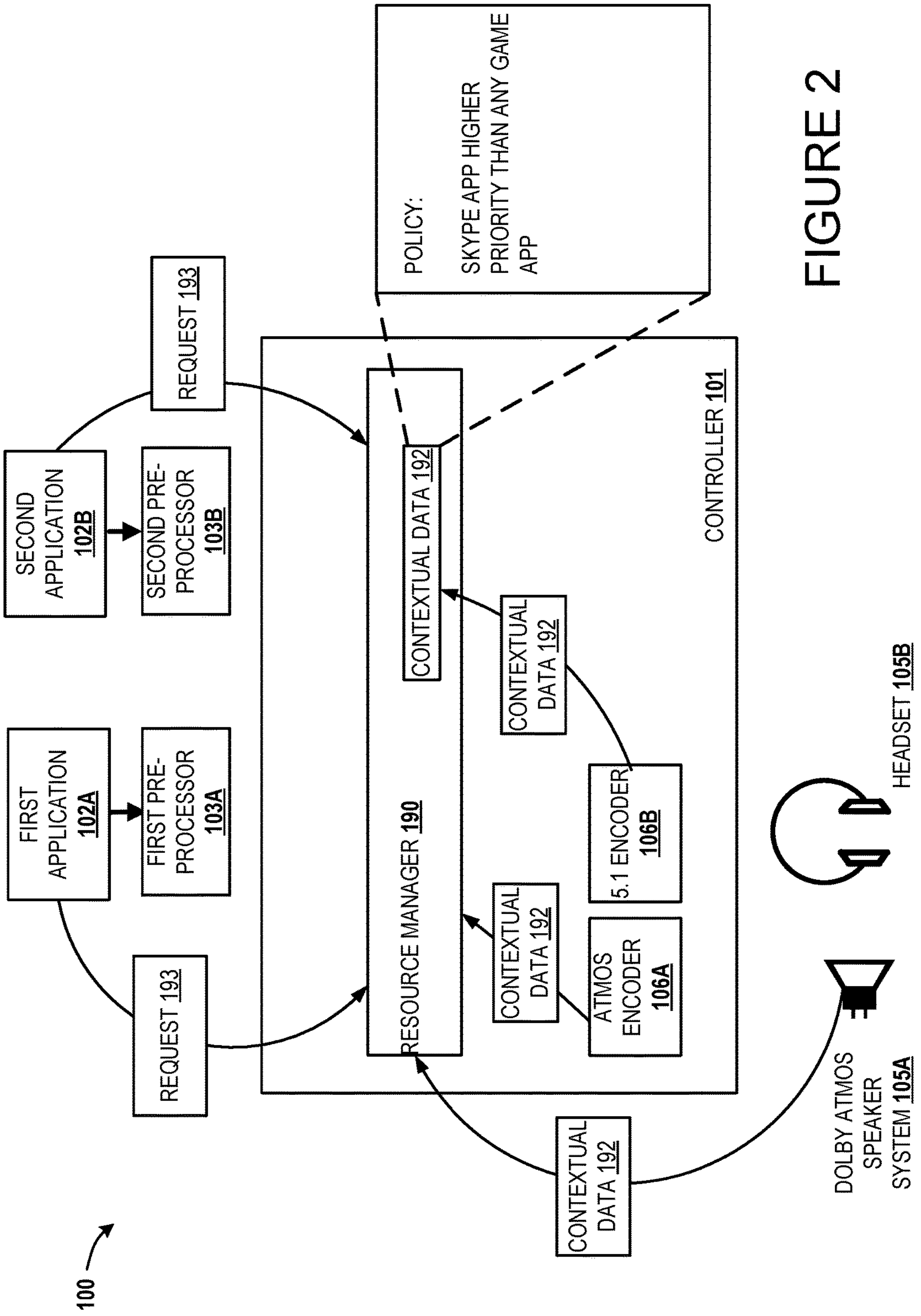
FIG. 2 shows a system and aspects of an example scenario showing the use of one or more minimum resource working sets.

Referring now to FIG. 2, an example scenario showing the use of one or more minimum resource working sets. In this illustrative example, contextual data 192 is received or otherwise obtained by the system 100. The contextual data 192 can be from any suitable source, e.g., manually entered by a user, an electronic switch to be activated by the presence of the pair of headphones, data may be received from one or more devices, such as an encoder or an endpoint device, etc. As summarized above, the resource manager 190 can use the contextual data 192 describing the capabilities of the system, preferences, and/or a policy to determine a threshold number of audio objects that can be processed by the system 100. In one illustrative example, the threshold number of audio objects can be 32 objects if an encoder is a Dolby Atmos encoder.

In the current example, the resource manager 190 receives a first request comprising metadata defining a first minimum number of audio objects and a first maximum number of audio objects for a first application. For illustrative purposes, consider an example where the first application is a videogame having a minimum of 28 audio objects and a maximum of 200 audio objects. The request can indicate that the first application would like the system to render audio data generated by the first application. This example is provided for illustrative purposes and is not to be construed as limiting. In some embodiments, a request may only include a minimum number of audio objects for any suitable application.

In response to receiving the first request, the resource manager 190 determines a number of objects that are to be allocated to the first application, wherein the allocation of audio objects is based, at least in part, on the threshold number of audio objects, the first minimum number, and the first maximum number. In addition, the number of objects allocated to the first application is less than or equal to the threshold number of audio objects. In the current example, 32 audio objects are allocated to the game application.

Once the allocation is made, the encoder generates a rendered output for the number of audio objects allocated to the first application. In addition, the resource manager 190 can also generate allocation data indicating a total number of allocated audio objects based, at least in part, on the number of audio objects allocated to the first application. In some embodiments, the resource manager 190 can dynamically update the allocation data each time audio objects are allocated to, or revoked from, an application.

In the current example, a second application is introduced. For illustrative purposes, the second application is a telecommunications program, such as Skype, that processes three-dimensional audio data. In this example, the second application has a minimum of two audio objects and a maximum of four audio objects. In such an example, the resource manager 190 can receive a second request from the second application, the second request comprising metadata defining a second minimum number of audio objects and a second maximum number of audio objects for the second application.

In response to receiving the second request, the resource manager 190 can determine if the total number of allocated audio objects and the second minimum number exceed the threshold number of audio objects. In response to determining that the total number of allocated audio objects and the second minimum number exceed the threshold number of audio objects, the system can determine if the number of objects allocated to the first application is above the first minimum.

In response to determining that the number of objects allocated to the first application is above the first minimum, the system can revoke one or more allocated audio objects from the number of objects allocated to the first application. The revocation does not reduce the number of objects allocated to the first application lower than the first minimum number. In addition, the revocation occurs when revocation can free a number of audio objects to meet the second minimum. In the current example, if the total allocation is at 32 objects and the system limit is 32 objects, the allocation to the game is reduced to make room for the second application. The reduction is anywhere from 2 to 4 objects given that the Skype has a min of two objects and game has a min of 28 objects.

In response to the revocation, the resource manager 190 can determine a number of objects allocated to the second application, wherein the number of objects allocated to the second application is no lower than the second minimum. Once the objects are allocated to the second application, the encoder can generate a rendered output for the number of audio objects allocated to the second application. Objects can also be allocated to the second application if, prior to the revocation mentioned above, the total number of allocated audio objects plus the second minimum number do not exceed the threshold number of audio objects.

In the above example, prior to the revocation, if the resource manager 190 determines that the free number of audio objects (the system threshold minus the number of allocated objects) and the number of possible revoked objects do not satisfy the second minimum number of the second request, the second request may not be fulfilled and the second application may not receive an allocation of objects. Instead, the second request can be placed in a queue and the second request can be fulfilled at a later time when such conditions are met.

Alternately, instead of placing requests in a queue, the resource manager 190 can also analyze a policy. The policy may define priorities with respect to each application. Thus, in the above example, if the resource manager 190 determines that the free number of audio objects and the number of possible revoked objects do not satisfy the second minimum number of the second request, the resource manager 190 can analyze a policy to determine if the second application has a higher priority than the first application. If the second application has a higher priority than the first application, the resource manager 190 can revoke all of the audio objects allocated to the first application and allocate a least a minimum number of objects to the second application.

As summarized above, the system can enable automatic updates to the minimum resource working sets. For instance, in the above example, the first application may provide an update indicating that the first minimum can be 15 instead of 28. When such an update is received, the resource manager 190 can adjust any of the allocations described above based on the new minimum. Such updates can also enable the system accommodate new requests from different applications.

Figure 3:
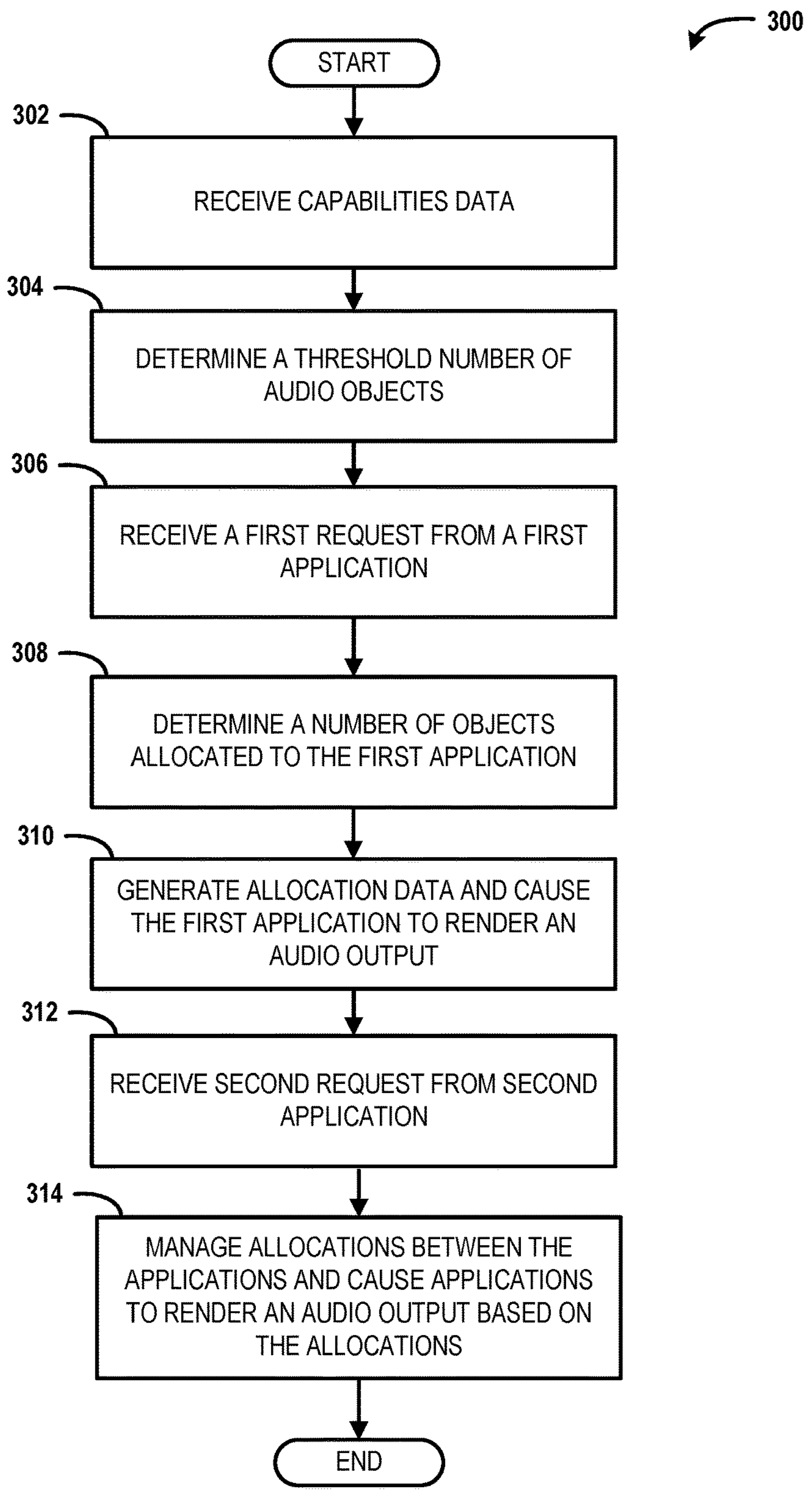
FIG. 3 is a flow diagram illustrating aspects of a routine for processing audio data, the routine utilizing one or more minimum resource working sets.

Turning now to FIG. 3, aspects of a routine 300 for processing audio data are shown and described below. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in its entirety. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As will be described in more detail below, in conjunction with FIG. 4, the operations of the routine 300 are described herein as being implemented, at least in part, by an application, such as an application and/or resource manager, which are individually and collectively described herein as a program module. Although the following illustration refers to a program module, it can be appreciated that the operations of the routine 300 may be also implemented in many other ways. For example, the routine 300 may be implemented by the use of other executable instructions sets, some of which may be part of an operating system. In addition, one or more of the operations of the routine 300 may alternatively or additionally be implemented, at least in part, by a client computer program or another application working in conjunction with one or more remote computers.

With reference to FIG. 3, the routine 300 begins at operation 302, where a program module receives capabilities data indicating capabilities of an encoder and an endpoint device. The capabilities data 192 can define the capabilities of one or more components, including but not limited to an encoder 106, an output device 105, an application 102 and/or other computing resources. The capabilities data 192 can also define one or more preferences, which may include user preferences, computer-generated preferences, etc. Based on the capabilities data 192, the resource manager 190 can determine a threshold number of audio objects that can be processed by an encoder and an endpoint device. For example, if one encoder 106 is based on the Dolby Atmos technology, the threshold number of audio objects may be 32 objects.

Next, at operation 304, the program module can determine a threshold number of audio objects that can be processed by the encoder and the endpoint device. In some embodiments, the threshold number of audio objects is based, at least in part, on the capabilities data indicating the capabilities of the encoder and the endpoint device. In some embodiments, the threshold number of audio objects can also be based on a spatialization technologies such as Dolby Atmos or HRTF, that is used to render an output.

Next, at operation 306, the program module can receive a first request from a first application. The first request can include metadata defining a first minimum number of audio objects and a first maximum number of audio objects for a first application. The request can indicate that the first application would like the system to render audio data generated by the first application. For illustrative purposes, consider an example where the first application is a videogame having a minimum of 28 audio objects and a maximum of 200 audio objects.

Next, at operation 308, the program module can determine a number of objects allocated to the first application. In some configurations, the allocation of audio objects is based, at least in part, on the threshold number of audio objects, the first minimum number, and the first maximum number. In some embodiments, the number of objects allocated to the first application is less than or equal to the threshold number of audio objects, and wherein the encoder generates a rendered output for the number of audio objects allocated to the first application.

Next, at operation 310, the program module can GENERATE ALLOCATION DATA indicating a total number of allocated audio objects based, at least in part, on the number of audio objects allocated to the first application. The program module can cause the first application to render audio based on the allocation.

Next, at operation 312, the program module can receive a second request from a second application. The second request can include a request for a system to render audio data from the second application. The second request can include metadata defining a second minimum number of audio objects and a second maximum number of audio objects for a second application.

Next, at operation 314, the program module can manage allocations between the applications and cause applications to render an audio output based on the allocations. In some embodiments, the program module can determine that the total number of allocated audio objects and the second minimum number exceed the threshold number of audio objects. In response to determining that the total number of allocated audio objects and the second minimum number exceed the threshold number of audio objects, the program module can determine that the number of objects allocated to the first application is above the first minimum number of audio objects.

In response to determining that the number of objects allocated to the first application is above the first minimum number of audio objects, the program module can revoke one or more allocated audio objects from the number of objects allocated to the first application, wherein the revocation does not reduce the number of objects allocated to the first application lower than the first minimum number, wherein the revocation occurs when revocation can free a number of audio objects to meet the second minimum.

In response to the revocation, the program module can determine a number of objects allocated to the second application, wherein the number of objects allocated to the second application is no lower than the second minimum, and wherein the encoder generates a rendered output for the number of audio objects allocated to the second application.

Figure 4:
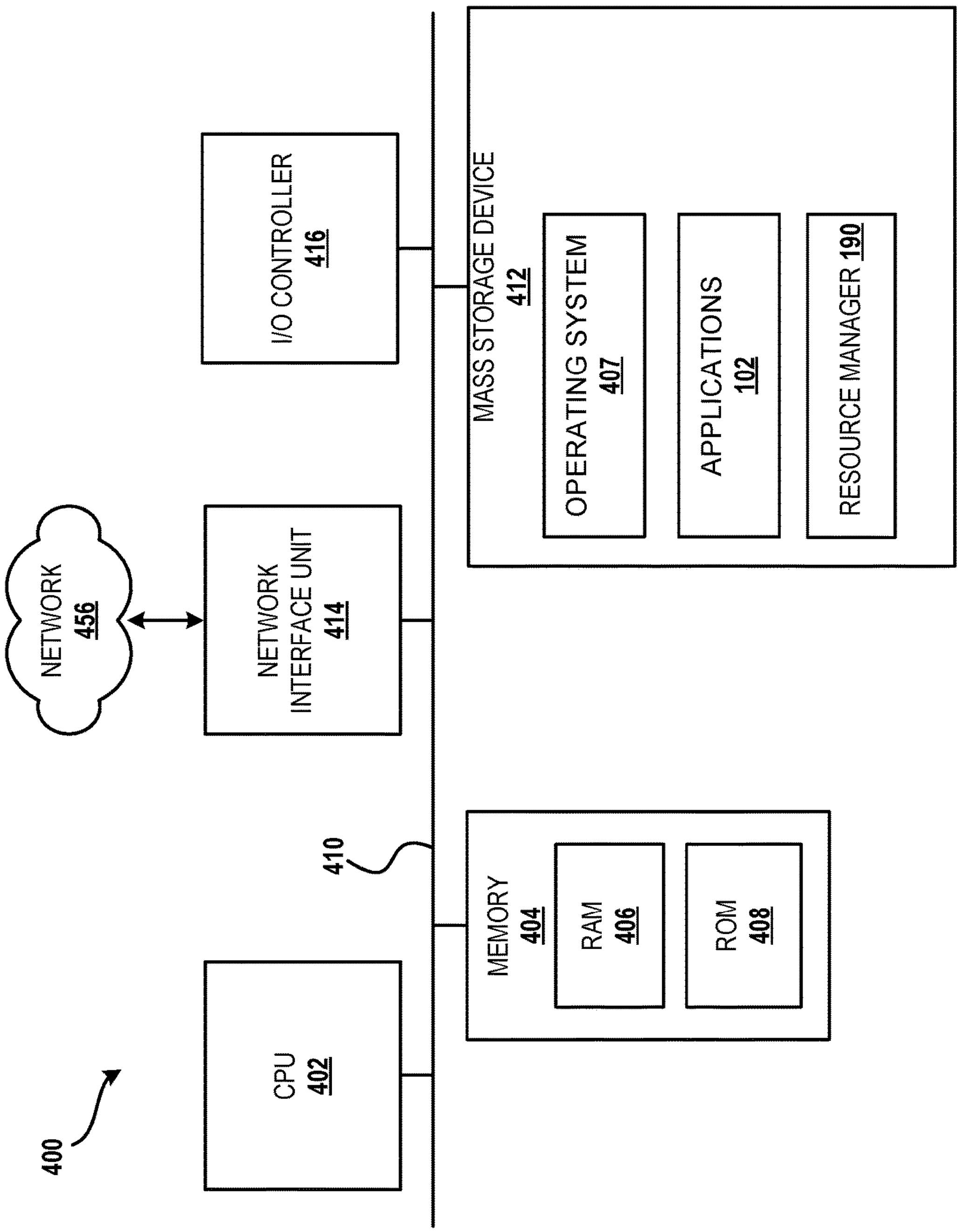
FIG. 4 is a computer architecture diagram illustrating an illustrative computer hardware and software architecture for a computing system capable of implementing aspects of the techniques and technologies presented herein.

FIG. 4 shows additional details of an example computer architecture 400 for a computer, such as the computing device 101 (FIG. 1), capable of executing the program components described herein. Thus, the computer architecture 400 illustrated in FIG. 4 illustrates an architecture for a server computer, mobile phone, a PDA, a smart phone, a desktop computer, a netbook computer, a tablet computer, and/or a laptop computer. The computer architecture 400 may be utilized to execute any aspects of the software components presented herein.

The computer architecture 400 illustrated in FIG. 4 includes a central processing unit 402 ("CPU"), a system memory 404, including a random access memory 406 ("RAM") and a read-only memory ("ROM") 408, and a system bus 410 that couples the memory 404 to the CPU 402. A basic input/output system containing the basic routines that help to transfer information between elements within the computer architecture 400, such as during startup, is stored in the ROM 408. The computer architecture 400 further includes a mass storage device 412 for storing an operating system 407, one or more applications 102, the resource manager 190, and other data and/or modules.

The mass storage device 412 is connected to the CPU 402 through a mass storage controller (not shown) connected to the bus 410. The mass storage device 412 and its associated computer-readable media provide non-volatile storage for the computer architecture 400. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 400.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 400. For purposes the claims, the phrase "computer storage medium," "computer-readable storage medium" and variations thereof, does not include waves, signals, and/or other transitory and/or intangible communication media, per se.

According to various configurations, the computer architecture 400 may operate in a networked environment using logical connections to remote computers through the network 456 and/or another network (not shown). The computer architecture 400 may connect to the network 456 through a network interface unit 414 connected to the bus 410. It should be appreciated that the network interface unit 414 also may be utilized to connect to other types of networks and remote computer systems. The computer architecture 400 also may include an input/output controller 416 for receiving and processing input from a number of other devices, including a keyboard, mouse, or electronic stylus (not shown in FIG. 4). Similarly, the input/output controller 416 may provide output to a display screen, a printer, or other type of output device (also not shown in FIG. 4).

It should be appreciated that the software components described herein may, when loaded into the CPU 402 and executed, transform the CPU 402 and the overall computer architecture 400 from a general-purpose computing system into a special-purpose computing system customized to facilitate the functionality presented herein. The CPU 402 may be constructed from any number of transistors or other discrete circuit elements, which may individually or collectively assume any number of states. More specifically, the CPU 402 may operate as a finite-state machine, in response to executable instructions contained within the software modules disclosed herein. These computer-executable instructions may transform the CPU 402 by specifying how the CPU 402 transitions between states, thereby transforming the transistors or other discrete hardware elements constituting the CPU 402.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 400 in order to store and execute the software components presented herein. It also should be appreciated that the computer architecture 400 may include other types of computing devices, including hand-held computers, embedded computer systems, personal digital assistants, and other types of computing devices known to those skilled in the art. It is also contemplated that the computer architecture 400 may not include all of the components shown in FIG. 4, may include other components that are not explicitly shown in FIG. 4, or may utilize an architecture completely different than that shown in FIG. 4.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method for managing a number of audio objects allocated to a first application executing on a computing device in communication with an encoder capable of processing a threshold number of audio objects, wherein the first application requires a first minimum number of audio objects, the method comprising:

receiving a request to execute a second application requiring a second minimum number of audio objects determining that the number of audio objects allocated to the first application and the second minimum number exceed the threshold number of audio objects;

in response to determining that the number of audio objects allocated to the first application and the second minimum number exceed the threshold number of audio objects, revoking one or more allocated audio objects from the number of audio objects allocated to the first application, wherein the revocation does not reduce the number of audio objects allocated to the first application lower than the first minimum number, wherein the revocation occurs when revocation can free a number of audio objects to meet the second minimum;

in response to the revocation, determining a number of audio objects allocated to the second application, wherein the number of audio objects allocated to the second application is no lower than the second minimum; and causing the encoder to generate a rendered audio output for the number of audio objects allocated to the second application and the number of audio objects allocated to the first application.

2. The method of claim 1, further comprising:

determining when a free number of audio objects and the number of possible revoked audio objects do not satisfy the second minimum number of the second request, in response to determining when the free number of audio objects and the number of possible revoked audio objects do not satisfy the second minimum number, placing the second request in a queue.

3. The method of claim 1, further comprising:

determining that a free number of audio objects and the number of possible revoked objects do not satisfy the second minimum number of the second request;

in response to determining that the free number of audio objects and the number of possible revoked audio objects do not satisfy the second minimum number, determining that a priority of the second application is higher than a priority of the first application;

in response to determining that the priority of the second application is higher than the priority of the first application, revoking the audio objects allocated to the first application and allocate at least the second minimum number of audio objects to the second application.

4. The method of claim 1, further comprising:

causing the first application to reduce a number of audio objects generated by the first application by at least one process including folding, co-locating, or removing one or more audio objects;

causing the encoder to generate the rendered audio output for the reduced number of audio objects.

5. The method of claim 1, further comprising:

determining that the total number of allocated audio objects and the second minimum number do not exceed the threshold number of audio objects;

in response to determining that the total number of allocated audio objects and the second minimum number do not exceed the threshold number of audio objects, determining the number of audio objects allocated to the second application, wherein the number of objects allocated to the second application is no lower than the second minimum, and wherein the encoder generates a rendered audio output for the number of audio objects allocated to the second application.

6. The method of claim 1, further comprising:

receiving an update to the first minimum number of audio objects or the second minimum number of audio objects; and adjusting the allocations to the first application or the second application based on the update to the first minimum number of audio objects or the second minimum number of audio objects.

7. The method of claim 1, wherein the threshold number of audio objects is based on data defining a spatialization technology, the spatialization technology associated with a limit of audio objects.

8. A computing device for managing a number of audio objects allocated to one or more applications executing on the computing device in communication with an encoder capable of processing a threshold number of audio objects, wherein the one or more applications require a minimum number of audio objects, the computing device comprising:

a processor;

a computer-readable storage medium in communication with the processor, the computer-readable storage medium having computer-executable instructions stored thereupon which, when executed by the processor, cause the computing device to receive a request to execute an additional application requiring an additional minimum number of audio objects;

determine if the number of audio objects allocated to the one or more applications and the additional minimum number of audio objects exceed the threshold number of audio objects;

in response to determining if the number of audio objects allocated to the one or more applications and the additional minimum number of audio objects exceed the threshold number of audio objects, revoke at least one audio object to be freed from the number of audio objects allocated to the one or more applications, wherein the revocation does not lower the number of audio objects allocated to the one or more applications lower than the minimum number of audio objects, wherein the revocation creates a number of revoked audio objects and the revocation occurs if the number of revoked audio objects meets or exceeds the additional minimum number of audio objects;

allocating at least a portion of the revoked audio objects to the additional application, wherein the number of audio objects allocated to the additional application is no lower than the additional minimum number of audio objects; and causing the encoder to generate a rendered audio output for the additional application and the one or more applications.

9. The computing device of claim 8, wherein the instructions further cause the computing device to:

determine if a difference between the threshold number of audio objects and the minimum number of audio objects is less than the additional minimum number of audio objects;

in response to determining if the difference between the threshold number of audio objects and the minimum number of audio objects is less than the additional minimum number of audio objects, place the request to execute the additional application in a queue.

10. The computing device of claim 8, wherein the instructions further cause the computing device to:

determine if a difference between the threshold number of audio objects and the minimum number of audio objects is less than the additional minimum number of audio objects;

in response to determining if the difference between the threshold number of audio objects and the minimum number of audio objects is less than the additional minimum number of audio objects, determine if a priority of the additional application is higher than a priority of the one or more applications;

in response to determining that the priority of the additional application is higher than the priority of the one or more applications, revoke the audio objects allocated to the one or more applications and allocate at least the additional minimum number of audio objects to the additional application.

11. The computing device of claim 8, wherein the instructions further cause the computing device to:

cause the one or more applications to reduce a number of audio objects generated by the one or more applications by at least one process including folding, co-locating, or removing at least the portion of the revoked audio objects; and cause the encoder to generate the rendered audio output for the reduced number of audio objects generated by the one or more applications.

12. The computing device of claim 8, wherein the instructions further cause the computing device to:

determine if the number of audio objects allocated to the one or more applications and the additional minimum number of audio objects do not exceed the threshold number of audio objects; and in response to determining if the number of audio objects allocated to the one or more applications and the additional minimum number of audio objects do not exceed the threshold number of audio objects, allocate at least the additional minimum number of audio objects to the additional application.

13. The computing device of claim 8, wherein the instructions further cause the computing device to:

receive an update to the minimum number of audio objects or the additional minimum number of audio objects; and adjust the allocations to the one or more applications or the additional application based on the update to the minimum number of audio objects or the additional minimum number of audio objects.

14. The computing device of claim 8, wherein the threshold number of audio objects is based on data defining a spatialization technology, wherein the spatialization technology is associated with a limit of audio objects.

15. A non-transitory computer-readable storage medium having computer-executable instructions stored thereupon which, when executed by one or more processors of a computing device, cause the computing device manage a number of audio objects allocated to one or more applications executing on the computing device in communication with an encoder capable of processing a threshold number of audio objects, wherein the one or more applications require a minimum number of audio objects, wherein the instructions cause the computing device to:

receive a request to execute an additional application requiring an additional minimum number of audio objects;

determine if the number of audio objects allocated to the one or more applications and the additional minimum number of audio objects exceed the threshold number of audio objects;

in response to determining if the number of audio objects allocated to the one or more applications and the additional minimum number of audio objects exceed the threshold number of audio objects, revoke at least one audio object to be freed from the number of audio objects allocated to the one or more applications, wherein the revocation does not lower the number of audio objects allocated to the one or more applications lower than the minimum number of audio objects, wherein the revocation creates a number of revoked audio objects and the revocation occurs if the number of revoked audio objects meets or exceeds the additional minimum number of audio objects;

allocate at least a portion of the revoked audio objects to the additional application, wherein the number of audio objects allocated to the additional application is no lower than the additional minimum number of audio objects; and cause the encoder to generate a rendered audio output for the additional application and the one or more applications.

16. The non-transitory computer-readable storage medium of claim 15, wherein the instructions further cause the computing device to:

determine if a difference between the threshold number of audio objects and the minimum number of audio objects is less than the additional minimum number of audio objects;

in response to determining if the difference between the threshold number of audio objects and the minimum number of audio objects is less than the additional minimum number of audio objects, place the request to execute the additional application in a queue.

17. The non-transitory computer-readable storage medium of claim 15, wherein the instructions further cause the computing device to:

determine if a difference between the threshold number of audio objects and the minimum number of audio objects is less than the additional minimum number of audio objects;

in response to determining if the difference between the threshold number of audio objects and the minimum number of audio objects is less than the additional minimum number of audio objects, determine if a priority of the additional application is higher than a priority of the one or more applications;

in response to determining that the priority of the additional application is higher than the priority of the one or more applications, revoke the audio objects allocated to the one or more applications and allocate at least the additional minimum number of audio objects to the additional application.

18. The non-transitory computer-readable storage medium of claim 15, wherein the instructions further cause the computing device to:

cause the one or more applications to reduce a number of audio objects generated by the one or more applications by at least one process including folding, co-locating, or removing at least the portion of the revoked audio objects; and cause the encoder to generate the rendered audio output for the reduced number of audio objects generated by the one or more applications.

19. The non-transitory computer-readable storage medium of claim 15, wherein the instructions further cause the computing device to:

determine if the number of audio objects allocated to the one or more applications and the additional minimum number of audio objects do not exceed the threshold number of audio objects; and in response to determining if the number of audio objects allocated to the one or more applications and the additional minimum number of audio objects do not exceed the threshold number of audio objects, allocate at least the additional minimum number of audio objects to the additional application.

20. The non-transitory computer-readable storage medium of claim 15, wherein the instructions further cause the computing device to:

receive an update to the minimum number of audio objects or the additional minimum number of audio objects; and adjust the allocations to the one or more applications or the additional application based on the update to the minimum number of audio objects or the additional minimum number of audio objects.

* * * * *